Aug. 26, 1969    C. I. MAUST    3,462,994
RELIEF VALVE WITH INDICATOR
Filed Aug. 29, 1966    6 Sheets-Sheet 1

INVENTOR
CHARLES I. MAUST
BY Martha G. Pugh
ATTORNEY

Aug. 26, 1969   C. I. MAUST   3,462,994
RELIEF VALVE WITH INDICATOR
Filed Aug. 29, 1966   6 Sheets-Sheet 2

INVENTOR
CHARLES I. MAUST
BY Martha J. Pugh
ATTORNEY

INVENTOR
CHARLES I. MAUST
BY
Martha H Pugh
ATTORNEY

INVENTOR
CHARLES I. MAUST
BY Martha H Pugh
ATTORNEY

Aug. 26, 1969  C. I. MAUST  3,462,994
RELIEF VALVE WITH INDICATOR
Filed Aug. 29, 1966  6 Sheets-Sheet 6

INVENTOR
CHARLES I. MAUST
BY Martha G. Pugh
ATTORNEY 3,462,994
RELIEF VALVE WITH INDICATOR
Charles I. Maust, 45 Blackburn Place,
Summit, N.J. 07901
Filed Aug. 29, 1966, Ser. No. 581,412
Int. Cl. G01l 27/02; F27b 37/46
U.S. Cl. 73—4        9 Claims

ABSTRACT OF THE DISCLOSURE

A pressure relief valve system for mounting atop a potentially explosive combustion chamber which comprises a number of coordinated safety features. These include an upwardly extending guard element surrounding the mouth of the valve concentrically to form an annular chamber open only at its upper end, for directing the emerging products of an explosion above the heads of adjacent personnel. A salient feature is the provision of an operations target pivotally mounted across the open end of the guard which, upon the occurrence of an explosion, is flipped over to display an indicator, and to simultaneously contact a microswitch which closes circuits for performing one or more functions, such as sounding alarms, flashing signal lights, and closing down operation of the malfunctioning combustion system. Means, including a vertically extending power jack, are also provided for in-place tests of the force necessary to dislodge the valve head from the valve seat.

---

This relates in general to pressure relief devices for chambers containing fluid; and more particularly to improved systems of valves and gates, including safety relief means, safety guard means, testing means, automatic shutdown and restart lockout means, and alarm devices, which are designed for application to combustion chambers of steam boilers, and to water or other types of heat generators.

It is a well-known fact that a substantial threat is posed by pressure steam boilers and other types of heating generators, to personnel and property, including the combustion chamber, boiler, furnace, heater, and other adjacent local property and equipment, even though the combustion chambers are equipped with standard explosion relief valves of types well known in the art. One of the reasons for this is that standard prior-art valves and gates often fail to operate at sufficiently low explosive forces to prevent rupture or damage to the corresponding boiler, furnace, or heater, because they have become corroded, fused, or welded at the junction of their fixed and movable elements. Moreover, many systems, including standard prior-art relief valves, lack proper "guard means" or specific means for automatically shutting down the boiler, furnace, or heater in such a manner as to lock out automatic restart means in the same. Further, standard prior-art relief valves lack specific operation testing means, or means to indicate to the inspector, attendant, or personnel, that there has been an explosion, or test of the operation of any of the explosion relief valves.

In many cases in the prior art, there has been no way to test standard explosion relief valves except by actual explosion, at which time the valves may fail to operate. Hence in the case of an explosion, responsible personnel are often never apprised of the fact that an explosion has occurred, and hence, the faulty system may continue to be depended upon, creating additional hazards. Furthermore, on many occasions, the actual operation of a relief valve or gate in response to an explosion creates a hazard because of the high-temperature, high-pressure blasts of fluids which are directed from the mouth of the valve in such a way that they may seriously injure, or even kill, persons nearby and/or destroy or damage adjacent property and equipment. It is a matter of record that some personnel have been injured, and that others have been killed in explosions of prior-art relief valves even though the said relief valve operated. In at least one case, a man's head was blown off by the gas blast occurring upon such a relief valve operation.

Accordingly, it is the principal object of this invention to provide an improved explosion relief valve system for furnaces or combustion chambers. More particularly objects of the invention are as follows:

(1) To control the predetermined minimum amplitude of explosive fluid force necessary to fully open the relief valve;

(2) To provide protection for adjacent or nearby personnel and property during any operation of the relief valve;

(3) To provide easy inspection or replacement of relief valve gasket, thereby encouraging frequent inspection and replacement, if justified;

(4) To test the operation of the relief valve system under conditions which simulate an actual explosion, without hazards and without changing the amplitude of internal gas forces which are later required to automatically open the valve;

(5) To provide a relief valve system which will not weld together or fuse closed during periods of disuse;

(6) To provide a relief valve system which responds instantly to explosive internal fluid forces;

(7) To automatically and instantly apprise responsible personnel of the occurrence of an explosion by appropriate remote and local alarms and signals, and simultaneously to provide for automatically and instantly shutting down operation of the equipment involved; and (8) To automatically and instantly shut down operation of the boiler equipment in such a manner that the equipment shall not automatically restart until a manual reset device is reset manually.

These and other objects are realized in an explosion release system in accordance with this invention comprising several coordinated safety features which are particularly adapted for use on existing and new combustion chambers of steam boilers, furnaces, and heaters.

For the protection of adjacent personnel, the mouth of a relief valve, which may, for example, be mounted atop a potentially explosive combustion chamber, is surrounded concentrically by an upwardly extending cylindrical guard element. This guard element is connected below the valve seat to form an annular chamber open only at its upper end, which is designed to direct the products of the explosion emerging from the relief valve above the heads of potentially adjacent personnel.

Furthermore, this present invention contemplates the periodic performance of "in place" pressure tests to determine the force necessary to dislodge the valve head from the valve seat. The testing means comprises a vertically expanding power jack, of any of the well-known types, which rests on a fixed pedestal centered above the valve head. The latter supports an upwardly extending rectangular frame or yoke to the underside of the top element of which is fixed a plate which engages the extended piston of the jack. A gauge connected to the jack is calibrated to read the pressure at which the valve head unseats when the jack is pumped up. The fixed platform on which the jack rests during the test procedure is positioned with its supporting face in a horizontal plane, slightly above the top edge of the cylindrical guard element so that the testing jack may be placed in position without removing the guard.

To prevent the relief valve from fusing closed or becoming welded together during periods of nonuse, or thoughtless applications of paint, the usual prior art valve stem, designed for slidable motion in a metal bushing, is replaced in this invention by a pair of coaxially aligned studs. One stud protrudes upwardly from the upper surface of the valve head and the other stud is mounted above the first and connected at its upper end to a fixed support. A compressional coil spring connected between the valve head and the fixed support surrounds the studs constituting the divided valve stem, the vertical separation between their inner stem ends being designed to exceed the maximum possible traverse of the valve head during an explosion.

Another feature of the invention also serves to prevent the valve from becoming fused closed during periods of nonuse and to provide that the exploding liquid can escape more freely than in prior art valves. This involves shaping the closure of the contacting flanges of the valve head and valve seat in a manner which provides for instant release of the gases emerging under force of an explosion from the valve head and through the annular vertical channel provided by the guard. The flange on the upper surface of the valve seat and the matching flange on the lower surface of the valve head are preferably bevelled at about a 45 degree angle. In a preferred arrangement, a high temperature gasket of glass wool, or similar nonmetallic material, is disposed between these matching surfaces.

As a further safety feature of the system, an operation target is pivotally mounted so that when the device is in normally unoperated position, a lever rests across the mouth of the annular chamber formed by the cylindrical guard member. In response to an explosion, the products of which are channeled upwardly through the cylindrical guard element, the lever, pivotally connected to the operation target, is rotated upward about the pivot point, so that the target is flipped over into its normally operated position, displaying an indicator which may be a small red metal flag, or the like, in order to apprise responsible personnel that an explosion has occurred.

As a final feature of the combination of the present invention, the operation target, in normally operated position, is connected to actuate an additional lever designed to close the contacts of a switch which may be connected to energize or deenergize one or more circuits to perform any one of a number of functions, including the sounding of an alarm, flashing of one or more signal lights, or activating a servo or other type of system to close down operation of the malfunctioning combustion system and to lock out the automatic restarting system.

These and other objects, features, and advantages of this invention will be apparent to those skilled in the art after a detailed study of the attached drawings, in which.

It will be apparent that explosion relief valves of the types disclosed and claimed herein are adapted for use in many different types of combustion chambers, such as for boilers, steam generators, furnaces or heaters, or any enclosure containing gas or fluid which is subject to an explosion which may rupture the container with possible disastrous results to adjacent persons and/or property.

Figure 1A:
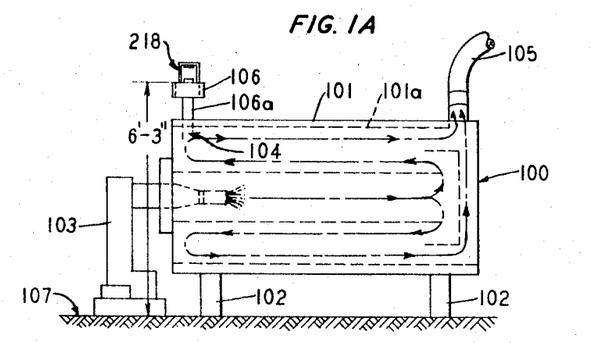
FIG. 1A is a schematic showing, in longitudinal section, of a combustion chamber, more specifically, a steam boiler, in accordance with a specific example, showing the position thereon of the relief valve assemblage of this invention.

In the present illustrative example, 100 represents a 3-pass steam boiler, the outer shell 101 of which is a cylinder 10 feet long, 4 feet in diameter, and a small fraction of an inch thick to hold the head insulation in position. Steam boiler 100 is mounted with its lowest point near the floor 107 of the chamber, on pedestal supports 102. Within the outer shell 101, is concentrically mounted a main shell 101a.

At one end of steam boiler 100 is a burner or heater assemblage 103, of any of the types well known in the art, which includes burners or other types of heating elements located adjacent to or connected to the first pass of the 3-pass boiler, and which in the illustrative example serve to heat the water in the boiler to produce steam. Under ordinary operating conditions, the combusted waste gases after passing from the first boiler pass, and the length of the boiler through a plurality of conventional boiler tubes, pass out through the flue pipe 105 to the chimney. In the event of malfunction of the combustion system, such as wrong ratio of air to fuel vapors or gases within the chamber 104 causing an explosion in any of the boiler passes, then the explosion relief valve will instantly release from the total combustion chamber the excess internal pressures caused by the explosion.

In accordance with the illustrative embodiment of the present invention under description, relief valve system 106 is mounted on a pipe 106a which extends down into the chamber 104. In preferred position the relief valve 106 is mounted directly on the top of and penetrating through the cylindrical shells 101 and 101a, near the end at which the burner or heater assembly is mounted, or at the opposite end. Alternatively, referring to FIG. 1C, the relief valve assembly 106' may be mounted slightly below the top so that the immediate exhaust pipe 106a' makes an angle of approximately 45 degrees or less with the vertical diameter of the boiler to clear the flue pipe 105. The explosion exhaust pipe 106a' is ultimately bent, or connected, to a section extending vertically upward, as indicated in the dotted line showing of FIG. 1C. The yoke 218 is part of a test system in accordance with the present invention which will be described in detail with reference to FIGS. 2A, 2B et seq.

In the specification hereinafter, unless otherwise indicated, for ease of identification, similar parts in each of the figures are represented by the same digits, the left-hand or hundreds numeral representing the figure number.

Figure 1B:
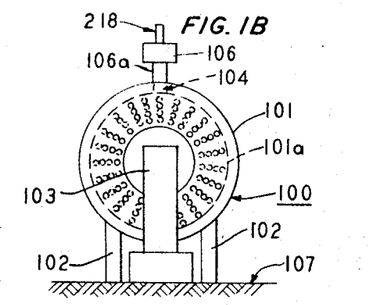
FIG. 1B is a front end-view of the steam boiler shown in FIG. 1A, indicating the position of the relief valve assemblage of this invention.
Figure 1C:
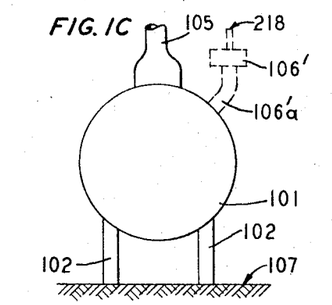
FIG. 1C is a rear-end view of a steam boiler in accordance with FIG. 1A, showing an alternative position for the relief valve assemblage of the present invention.
Figure 2A:
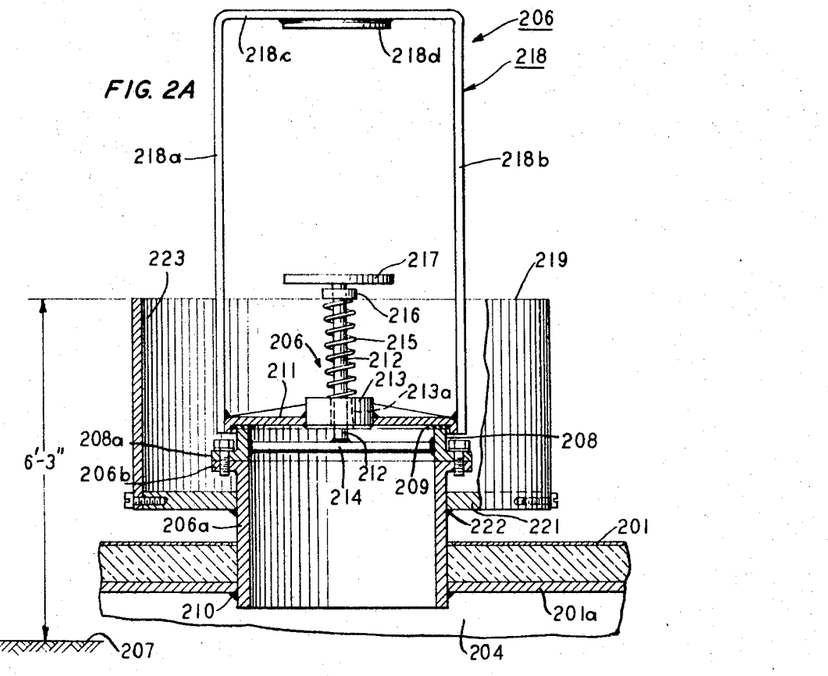
FIG. 2A is an enlarged front elevational view broken away to show the cross-section of an embodiment of the relief valve assemblage of the present invention, including the cylindrical guard element and rectangular frame for accommodating a testing jack.

Referring now to FIG. 2A of the drawings, which is an enlarged detailed showing of one embodiment of the invention, 201 represents the thin metal outer shell, and 201a represents the main steel inner shell of the boiler, with heat insulation between the two shells of boiler 100, shown in FIGS. 1A, 1B, and 1C, on which is mounted an assemblage including the relief valve 206 which corresponds to valve 106 of FIGS. 1A and 1B.

In the present embodiment, a steel pipe 206a, one-quarter of an inch thick, having an outer diameter of 6½ inches, and a total length sufficient to place the top of guard 219 6 feet, 3 inches, or more, above the boiler room floor. Moreover, pipe 206a projects at its lower end into the combustion chamber 204, or into one of the combustion chamber's hot gas passes, to a fractional inch depth below the top inner surface of the main shell of the boiler, being rigidly sealed in place by hermetical seal 210. At its upper end, pipe 206a extends, in the present example, several inches above the top of the outer shell 201 of the steam boiler, terminating at its top edge in a flange 206b, to which is bolted, or otherwise secured, flange 208a the upper end of which forms the valve seat 208. On the latter rests a gasket 209 comprising any of the types of compressed glass wool, or suitable synthetic materials, well known in the art, which are designed to withstand temperatures of the order of 400 degrees Fahrenheit for low pressure boilers, and higher temperatures in the case of higher pressure boilers.

In normally closed condition of the valve 206, the valve head 211 fits in gas-tight relation against the gasket 209 resting on the valve seat 208. The valve head 211 comprises a steel disk ¼ inch thick, the outer periphery of which is bent to form a flange extending downwardly about ½ inch.

Centrally disposed and formed integrally into the valve head 211, is a cylindrical hub 213, which has a central axial bushing 213a slidably mounted on rod 212, of steel ⅜ of an inch in diameter and 6 inches long, comprising the valve's fixed stem. At its lower end, below the mouth of valve seat 208, the valve stem 212 is rigidly anchored in axial relation to the inner walls thereof by means of a single cross-rod 214. At its upper end, rod 212 extends in rigid axial position above the valve head 211, supporting disk 216, which serves as the upper termination point for the helical spring 215, and which also supports disk 217 which serves as a mounting for the test jack, shown in FIG. 2C, to be described presently.

The valve head 211 is held in normally closed condition against the compression of the spring 215, which is helically wound about the valve stem 212, the bottom of spring 215 pressing against the hub 213, and the top pressing against the disk 216.

In the present embodiment, spring 215 is designed to exert a total force of 140 pounds to seal the combustion chamber for the normally low pressure condition of the combustion gases, and to release the valve whenever an explosion force of 141 pounds or more exerted on the valve head 211 acts to further compress the spring and open the valve.

A rectangular framework or yoke 218 comprising a U-shaped piece of steel ¼ inch by 2 inches includes a pair of vertical arms 218a and 218b, 8¼ inches in overall height, connected by a horizontal cross-piece 218c, so that the yoke is 7 inches in overall width. The lower ends of arms 218a, 218b are welded, or otherwise rigidly secured, to diametrically opposite positions on the flanged edge of valve head 211 so that the lower face of horizontal member 218c is 7⅞ inches above the top of guard 219 to permit the test jacket 224, shown in FIG. 2C, to be easily inserted between disks 217 and 218d.

The function of the frame or yoke 218 is to provide a facility for in-place testing of the total measured force required to lift the valve head 211 from the valve seat 208 against the compression of spring 215, and to overcome any tackiness or corrosion tending to cause valve head 211 to adhere to valve seat 208. For this purpose the steel disk 217 is welded or otherwise rigidly mounted to the spring anchor disk 216. The disk 217, superposed on disk 216, is 3 inches in diameter and ¼ inch thick. A matching disk 218d is centered on and rigidly mounted on the underside of the upper member of frame 218.

Figure 2B:
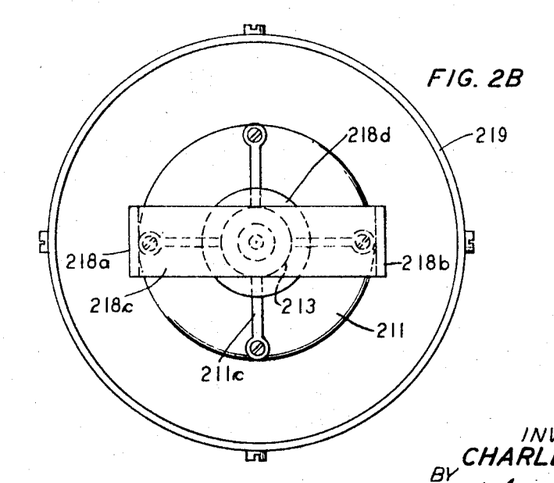
FIG. 2B is a plan view of the showing of FIG. 2A.
Figure 2C:
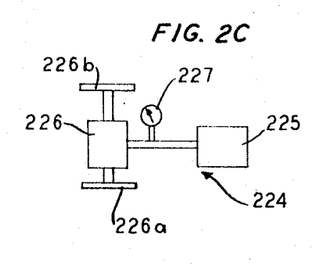
FIG. 2C is a schematic showing of a typical lift jack, including a power source and pressure gauge, adapted for the testing purposes of the present invention.

The facilities just described serve to provide a setting for the operation of a lift jack, such as shown in FIG. 2C. The purpose of the tests performed by the lift jack is to prove that the relief valve 206 is free to open at a force corresponding to its design value of 140 pounds or more, that it has not been corroded shut, and further, to prevent disasters caused by exploding the combustion chambers.

The lift jack 226 comprises any type of vertical lift jack well known in the art, such as pneumatic, hydraulic, lever, or electrical, which can be operated manually or from a conventional source of power 225. The oppositely disposed platforms 226a and 226b of lift jack 226 are designed to be mounted between the disks 217 and 218d. The jack is first mounted with platform 226a in contact with disk 217. The jack 226 is then expanded until the upper side of platform 226b is in contact with the underside of disk 218d. Power is then applied from the source 225 to cause the jack to exert pressure on the upper disk 218d until the valve head 211 is lifted off of valve seat 208 against the compression of spring 215. The amount of the pressure required to just lift the valve head 211 from the valve seat 208 is indicated by the pressure gauge 227, which is calibrated to read pressure in pounds per square inch, or force in total pounds. The gauge readings taken during the test are compared to the stated design value of force required to operate the relief valve, which is 140 pounds.

An additional feature indicated in the embodiment of FIGS. 2A and 2B is the cylindrical guard or shield 219. The latter is a 360 degree cylinder of steel, 12 inches in outer diameter, ¼ inch thick, and 6 inches in vertical depth, the lower end of which is disposed to surround the top end of pipe 206a including flange 206b. Guard 219 is mounted on an annular disk 221, the outer periphery of which is screwed or otherwise fastened to the inner periphery of the bottom end of cylinder 219, for easy removal of the latter for inspection and servicing of gasket 209. The inner periphery of disk 221 is welded or otherwise secured to the outside of pipe 206a at a point above the top of the boiler, such that the top of guard 219 is 6 feet, 3 inches above the boiler room floor, and thus higher than an average man's head. Hence, upon operation of the valve 206, whereupon the valve head 211 is lifted off of valve seat 208, the effluent hot gases and/or any other fluids moving with explosive force from the chamber 204, pass through the annular channel 223 and are released to the atmosphere at a height above the heads of any men who might be nearby, thereby preventing persons close to the relief valve from sustaining injury or death.

Another feature of the cylindrical guard 219 is that its height is so designed that about ⅛ to 1/16 of an inch clearance is maintained between its upper edge and the supporting platform 217. This enables lift pump 226 to be placed in position to conduct lift tests without disturbing the cylindrical guard 219.

Figure 3A:
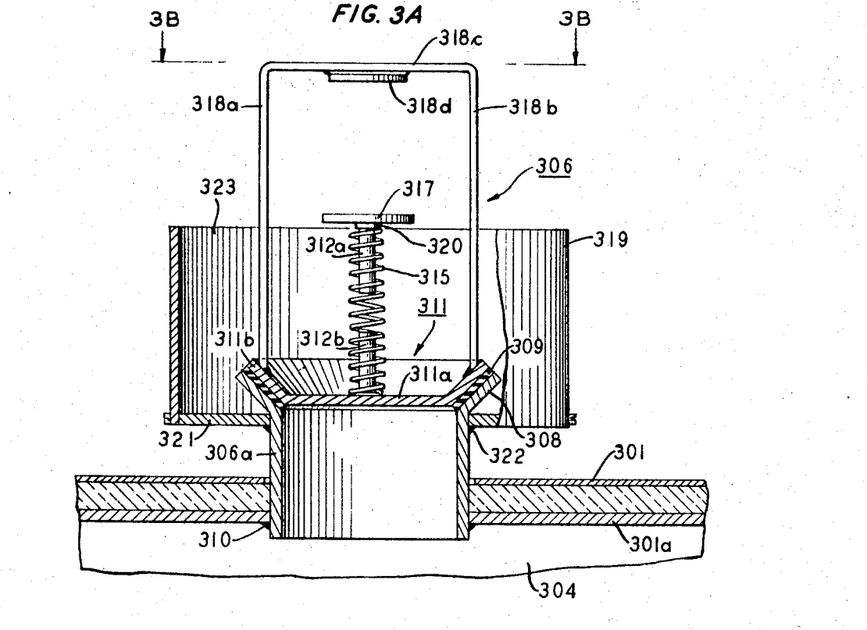
FIG. 3A is a front elevational view broken away to show the cross-section of an alternative embodiment of the relief valve assemblage of the present invention which has been modified to include a composite valve stem and bevelled edges on the matching flanges of the valve seat and valve head.
Figure 3B:
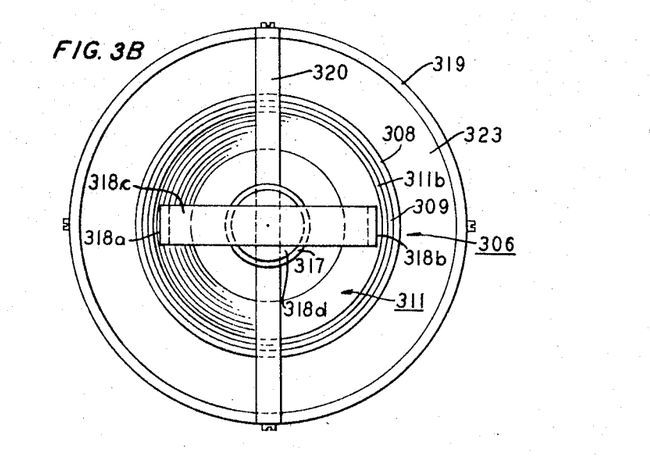
FIG. 3B is a plan view of the showing of FIG. 3A.

Referring, now, to FIGS. 3A and 3B, there are shown in sectioned front elevation and plan view, respectively, a modified embodiment of the invention which includes two additional features. The first is an arrangement in which the matched peripheral flanges on the valve head and valve seat are bevelled upward, thereby permitting the gases or other fluids to more readily escape upon explosion from the chamber 304 into the annular escape chamber 323. The second feature comprises replacing the unitary valve stem 212 of FIGS. 2A and 2B with a divided valve stem 312a, 312b in FIG. 3A, thus eliminating necessity for slidable motion of the valve stem in a bearing wherein the parts may become corroded or partly fused together with disuse and moisture.

In the modified embodiment under description, the pipe 306a is of such a length as to cause the top of guard 319 to be 6 feet, 3 inches or more above the boiler room floor. Pipe 306a, which may, for example, be formed of steel having an outer diameter of 6½ inches and an inner diameter of 6 inches, is hermetically sealed, as in the previously described embodiment of FIGS. 2A and 2B, so that it penetrates the inner and outer shells 301 and 301a of the steam boiler. The lower end or pipe 306a extends one inch into the combustion chamber 304; and the upper end extends vertically upward above the outer periphery of shell 301, terminating at its upper end in a flange 308, 1⅛ inches wide, and ¼ inch thick, which is bent outwardly and upwardly to form an angle of about 45 degrees with the vertical. An annular gasket 309 is formed of glass wool, or high temperature synthetic gasket material, resistant to heat up to 450 degrees Fahrenheit, which is ⅛ inch thick and has a width and configuration which permits it to seat on the flange 308 co-extensively therewith. The valve head 311 in this embodiment is also formed of steel ¼ inch thick and includes a central or disk-shaped portion 311a of a diameter to conform to the flange 308, and a flanged portion 311b which is bent upwardly and outwardly at an angle of approximately 45 degrees so that it seats in fluid-tight relationship against the upper surface of the gasket 309 against the compression of the helical spring 315, which in the present example is designed to exert a force of 140 pounds against the center of the valve head.

As in the previously described embodiment, a guard element 319 comprising a 360 degree cylinder of steel, ¼ inch thick, having an outer diameter of 12 inches, and an axial depth of 6 inches, is disposed to surround the valve 306 concentrically. Also, as in the previously described embodiment, the guard element 319 is closed at the bottom by an annular disk 321 which may be formed separately from the cylindrical element to which it is screwed or welded as shown; or alternatively, the annular bottom closure 321 may be formed integrally with the cylindrical element 319. In either case, it provides an annular cup which is welded or otherwise sealed in a fluid-tight junction 322 to the outer periphery of the pipe 306a just below the flanged valve seat 308. The screwed-on form of cylinder 319 is preferable for inspection and servicing of the valve gasket 309.

As in the previously described embodiment, a rectangular frame 318, comprising a U-shaped yoke of ¼ inch by 2 inch steel, has vertical arms 318a, 318b, both 8¼ inches high, which are fastened together at the top with a horizontal member 318c which is 7¼ inches in overall length. The latter is disposed with its lower face 7⅞ inches above the top of guard 219 to permit the testing jack to be inserted easily between disks 317 and 318d, in the manner previously described in detail with reference to FIGS. 2A and 2B, using a lift jack of the type disclosed with reference to FIG. 2C. The frame or yoke 318 functions to provide a facility for in-place testing, in the manner described in detail with reference to FIGS. 2A and 2B. The bottom ends of the members 318a and 318b are rigidly fastened at diametrically opposite positions on the inside of flange 311b.

For this purpose the upper disk 318d, designed to contact the upper platform 226b of the lift jack 226 of FIG. 2C, is a steel disk 3 inches in diameter and ¼ inch thick, welded to the center underside of the horizontal member 318c. The matching disk 317, which is positioned with its principal horizontal plane parallel to and at a vertical separation of 7⅛ inches from the disk 318d, is welded to, or otherwise rigidly fixed to, the top of a horizontal member 320, comprising a stainless steel member 2 inches wide and ¼ inch thick, which is connected to diametrically opposite positions on the upper edge of the cylindrical guard 319, as shown in FIG. 3B, and extending normal to the plane of FIG. 3A.

The horizontal member 320 also serves as a rigid support for the downwardly extended portion of the divided valve stem 312a, which is a steel stud ⅜ inch in diameter and 2 inches long, centered on the underside of member 320, concentric with disk 317. When the valve 306 is in normally closed position, the bottom end of the stud 312a is vertically separated a distance of 1½ inches from the top end of the stud 312a, comprising the upwardly extended portion of the valve stem. The latter is of the same material and cross-sectional dimension as stud 312a, and is 2 inches long, having its lower end welded or otherwise rigidly fixed to the center of the top of valve head 311.

The helical compressed spring 315 is similar to that described with reference to FIGS. 2A and 2B. Spring 315 is pressed at its lower end to the center of the valve head 311 and at its upper end to the underside strut 320. Further, helical spring 315 is wound about the stud 312a at its upper end and 312b at its lower end, maintaining the studs in substantially vertical alignment. In normally closed condition, a separation is maintained between the ends of the studs which matches the maximum possible traverse of the valve head 311 against the compression of the spring 315 during the interval of an explosion; but the ends are located sufficiently close to insure stable positioning of spring 315.

It will be noted that the clearance between the upper face of the disk 317 which accommodates and supports the lift jack 226 and the upper surface of the top of guard 319 is about ⅝ of an inch, which is sufficiently large to enable the jack to be placed in position for an in-place test without removing the guard 319 or any of its connections.

FIGS. 4A through 4F of the drawings show a modification of a steam-boiler safety system, including a well-known type of explosion relief valve, which includes, in addition to the cylindrical guard element of the present invention, an automatic operation target and an alarm system. The latter not only operates to apprise responsible personnel of the occurrence of an explosion, but additionally, may be electrically connected to give local and remote visual and audible signals, and to actuate a servo system to shut down the fuel supply thereby closing down operation of the faulty boiler (or furnace, or the like) which caused the exposion. Also, the alarm system may be applicable for local alarm and simultaneous or alternate distance alarms, such as for other parts of the building, other parts of the city, or for a distant city where a centralizer control office may be located.

In the present illustrative example, the relief valve system, including modifications of the present invention, as shown in FIGS. 4A through 4E, is mounted on top of a typical steam-boiler in the manner indicated in FIGS. 1A and 1B of the drawings, or may alternatively be mounted in the manner indicated in FIG. 1C.

Figure 4A:
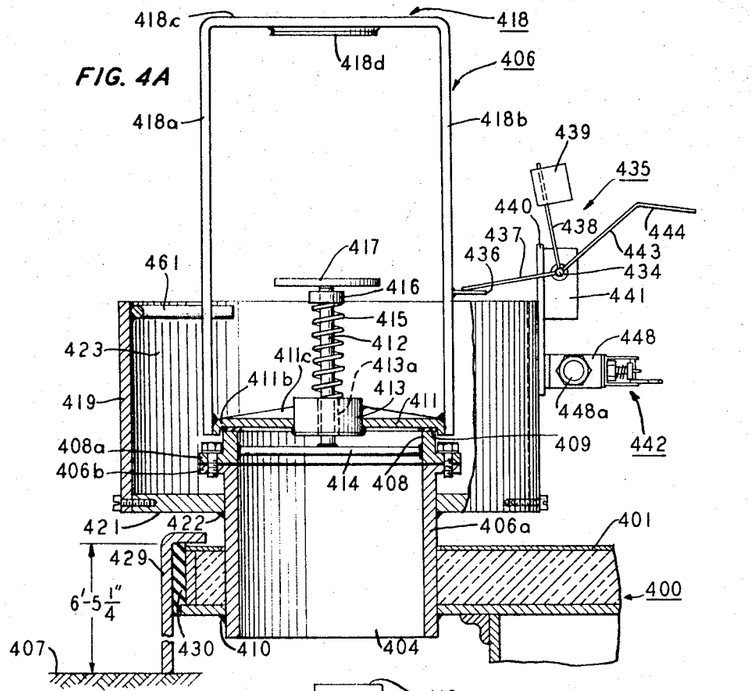
FIG. 4A is a sectioned front elevational view showing a further modification of the relief valve assemblage of the present invention to include an operation target and switch for appropriate alarm, annunciator, and automatic shutdown and lockout systems.
Figure 4B:
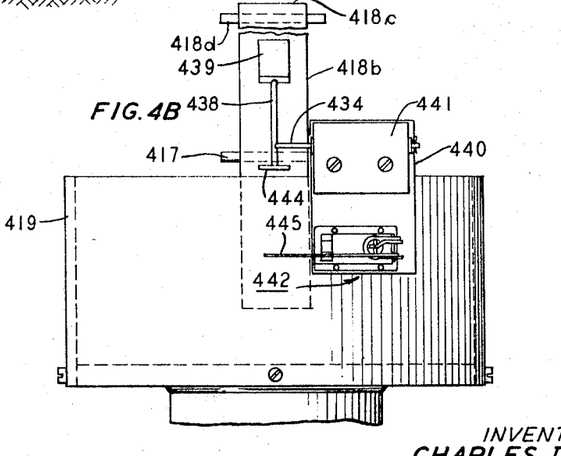
FIG. 4B is a side elevational view of the combination of FIG. 4A.
Figure 4C:
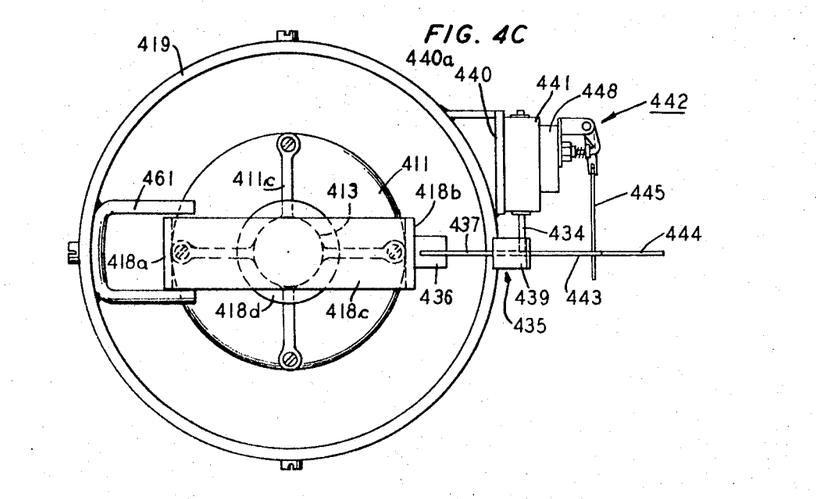
FIG. 4C is a plan view of the combination of FIGS. 4A and 4B.
Figure 4D:
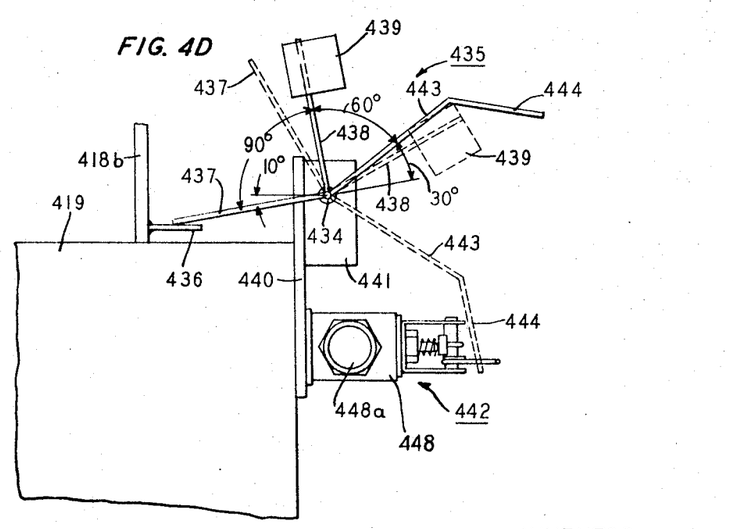
FIG. 4D is an enlarged detailed view of the operation target and microswitch of FIGS. 4A, 4B, and 4C.
Figures 4E, 5B:
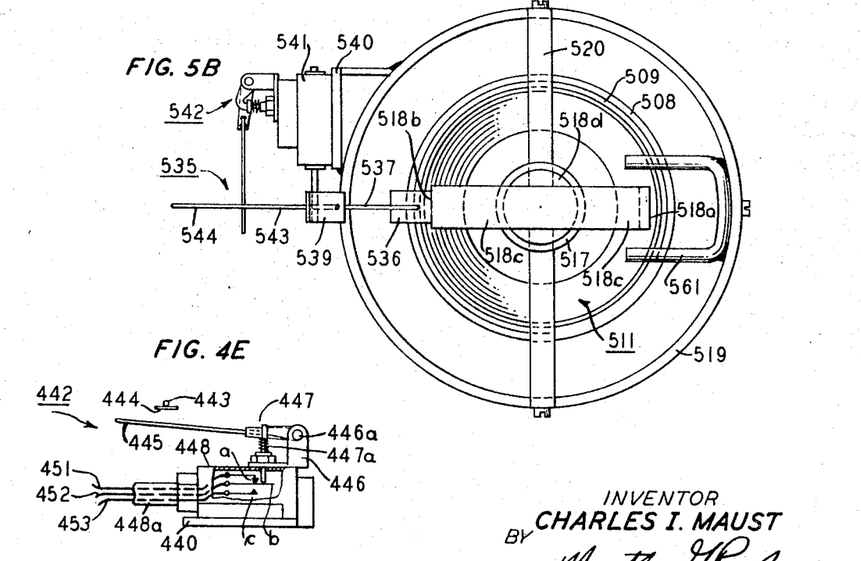
FIG. 4E is a partly sectioned side-elevational view of the microswitch 442 of FIG. 4D.
FIG. 5B is a plan view of the sectioned front view of FIG. 5A.
Figure 4F:
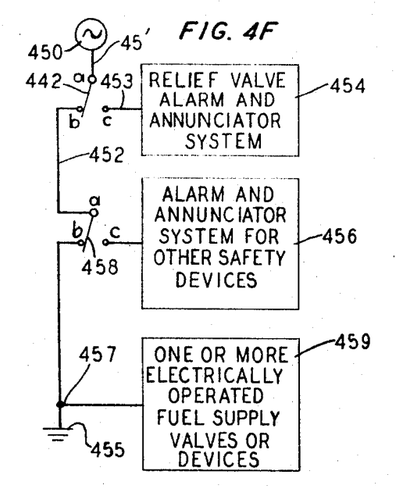
FIG. 4F is a simplified schematic of the alarm, annunciator, and automatic shutdown circuit actuated by the mechanism of FIGS. 4A through 4E.

As previously pointed out, FIGS. 4A and 4B, respectively, show a sectioned front elevation and side elevation of the modification under description; whereas FIG. 4C shows a plan view; FIG. 4D is an enlarged, detailed sectional view of the operation target and microswitch; and FIG. 4E is a partly sectioned side-elevational view of the microswitch 442 of FIG. 4D. FIG. 4F is a simplified circuit schematic.

Referring to FIGS. 4A, 4B, and 4C, the separation between the outer shell 401 of the boiler 400 and the inner chamber 404 is 2½ inches. In the example under description, the periphery of the outer shell 401 is 6 feet, 5¼ inches from the floor 407 of the boiler room. 429 represents the front cover of the boiler which terminates at its upper end in a flange fitting over an insulating gasket 430.

In the present illustrative embodiment, a steel tube 406a, about 5 inches long, having an outer diameter of 6½ inches and a wall thickness of ¼ inch, is inserted vertically into the top of the boiler, combustion chamber, or hot gas end-pass, with its lower end extending ¼ inch into the chamber 404. It is welded into place with hermetical seals 410 and 422. In the present example, the upper end of the tube 406a extends several inches beyond the outer shell 401 of the boiler, having mounted concentrically thereon a superposed ½ inch thick steel flange 321, having an outer diameter of 11½ inches and an inner diameter of 6 inches, which is welded into position at the junction 422.

Above the flange 421, tube 406 terminates in a short flange 406b, to which is secured a matching flanged base portion 408a with an outer diameter of 8¼ inches, an inner diameter of 6 inches, and ¼ inch thick, on which is superposed a neck 1 inch deep, 6½ inches in outer diameter, and ¼ inch thick, which serves as a valve seat 408. The flanged base portion 408a is fastened into place by means of four threaded studs ⅟₁₆ inch in diameter and 1¼ inches long, fixed to the surface of the supporting flange 406b. The studs are mounted in holes centered about ½ inch inside the periphery of flange 408a and are secured with lock nuts. An annular asbestos or silicone wool gasket which is ⅛ inch thick and ¾ inch wide, is interposed to separate the surfaces of flanges 408a and 406b.

The combustion explosion relief valve adapted for use with the assemblage under description may be, for example, of the type manufactured by the Burnham Corporation of Irvington, N.Y., as model No. 83650, shown in their drawing No. 2037 of Aug. 31, 1965, which was drawn in accordance with a design of Dec. 6, 1960.

The aforesaid valve includes a valve head, or gate-cap, 411 comprising steel ³⁄₁₆ inch thick and 7¼ inches in diameter, at the periphery of which is a downwardly bent flange 411b, which fits over a gasket 409 resting on the upper edge of the collar or valve seat 408. The gasket 409 is formed of asbestos ³⁄₁₆ inch thick, has an outer diameter of 6¾ inches, and an inner diameter of ½ inch. It is covered on both sides with aluminum foil. On the center of valve head 411 is mounted a hub 413 which is 1¼ inches in diameter and 1 inch high. To the latter, on the upper face of valve head 411, are fastened four ribs 411c which are ¼ inch in diameter and are disposed at angles of separation of 90 degrees, attached at their outer ends to the periphery of the valve head 411.

A ½ inch diameter steel rod 312, which is 6 inches long, is mounted vertically to slide in bore 413a in the hub 413. At its lower end, rod 412 is welded or otherwise rigidly fixed in a concentric position with reference to valve seat 408 by means of cross-rod 414, attached at diametrically opposite positions inside the neck of valve seat 408, below the mouth. The flange 416, about 1⅛ inches in outer diameter and ³⁄₁₆ inch thick, is fixed to the top end of rod 412 with its upper face about ¾ inch from the tip. A plate 417, which is 3 inches in outer diameter and ¼ inch thick, is centrally welded to the top of the rod 412, to function as a supporting platform for the lift jack test of FIG. 2C, in the manner previously described.

Rod 412 is encased in a helically wound spring 415 which presses at its lower end on the hub 413 and at its upper end, on the fixed flange 416. The helical spring 415 comprises 0.135 steel wire, wound into a helex of thirteen coils having an outer diameter of 1⅛ inches and a free length of 4¾ inches. In normally closed condition of the valve, the spring 415 forces the valve head 411 against the valve seat 408 with a compressional force of 140 pounds. When an explosion occurs, the valve head, or cap, 411 is forced to move upward against the compression of spring 415, the hub 413 moving slidably along the rod 412.

The rest of the assemblage is substantially similar to those elements shown in the previous FIGS. 2A, 2B, 2C, and 3A, 3B. It includes a rectangular frame 418 which is brazed to diametrically opposite positions on the periphery of gate cap or valve head 411. Frame 418 comprises a U shaped member of 2 inches by ¼ inch steel, including a pair of parallel vertical steel arms 418a and 418b, each 8¼ inches long, connected together at the top by a horizontal member 418c which is 7 inches long. To the underside of the latter, at the center, is welded a steel plate 418d, similar in material and dimensions to plate 417, which serves as the upper contracting platform for the lift jack shown and described with reference to FIG. 2C.

As in previously described embodiments, the cylindrical guard 419, which in the present example is a steel tube 6 inches long, of 12 inches outer diameter and ¼ inch wall thickness, is fastened with four ¼ inch screws to the outer periphery of the flange 421, to provide an annular vent 423 when the relief valve operates.

The platform 417 is designed to provide a vertical clearance of about ⅝ inch above the outer periphery of the steel guard 419 so that, as previously explained, the lift jack test can be made without disturbing the guard assemblage.

A further important innovation added to the embodiment under description is operation target 435, and the accompanying annunciator system, shown in detail in FIG. 4D. A steel base plate 440, ⅛ inch thick, 3 inches wide, and 4½ inches long, is welded with its long end vertical, so that it protrudes 1½ inches above the upper edge of guard 419. Referring to the side and plan views, FIGS. 4B and 4C, the edge of base plate 440 is welded tangentially to guard 419 in a position which is substantially vertically aligned with or slightly overlaps the edge of vertical arm 418b of test means yoke 418. The outer end of plate 440 is supported by a short stud 440a, also welded to guard 419 (see FIG. 4C).

To the outer surface of plate 440 is screwed a bearing 441 of "Teflon" (registered trademark of E. I. du Pont de Nemours & Company for polymerized tetrafluoroethylene), or similar material, 1 inch thick, 2¾ inches wide, and 2 inches high, which is mounted so that its lower end is ½ inch below the edge of guard 419, and the upper edge extends 1½ inches above the edge of the guard. Referring to the side and plan views, FIGS. 4B and 4C, the inner edge of the tetrafluoroethylene bearing is 1⅛ inches from the center plane through yoke-arm 418b.

As shown in detailed FIG. 4D, tetrafluoroethylene bearing 441 contains a bore located half way through its thickness and ⅞ inch above the edge of guard 419, in which is rotatably mounted a steel rod 434 which is ⅛ inch in cross-section, and 4 inches long, which is held in place by washers at both ends, and a small cotter pin at the outer end.

A steel ledge plate 436, which is ⅟₁₆ inch thick, 1 inch long, and ½ inch wide, is welded onto the outer surface of arm 418b of test yoke 418, symmetrical to the center plane, and with the upper face of plate 436 parallel to and ¼ inch above the plane of the top edge of cylindrical guard 419. Steel rod 437, which is ³⁄₁₆ inch in diameter and 3 inches long, is rigidly fastened at its inner end to pivotal rod 434, about 1⅛ inches from the inner edge of bearing 441, so that rod 437 pivots on rod 434 in a plane passing vertically through the center of arm 418b of test yoke 418.

In the normally closed condition of the explosion relief valve, the outer end of rod 437 rests by force of gravity against the ledge plate 436, making an acute positive angle of about 10 degrees with the horizontal. A second steel rod 438, of the same dimensions as 437, is also fastened to pivot on rod 434, making a rigid 90 degree angle with rod 437, so that in normally closed condition of the valve 406, rod 438 is positioned at a counterclockwise angle of 10 degrees from the vertical, in the plane of FIG. 4D. A steel target-weight 439, comprising a steel 1-inch cube weighing 0.28 pound, is fastened onto the end of rod 438, the latter rigidly fitted into a bore parallel to and ¼ inch from the inner edge of the cube in the plane of FIG. 4D, and spaced halfway through the depth of the cube. In the present example, weight 439 operates about the fulcrum represented by pivotal rod 434, from its center of gravity through a lever arm of 2¾ inches.

Whenever ledge plate 436 rises by force of an explosion operating relief valve 406, thereby moving rod 437 a quarter of an inch or more upward from its normal, unoperated position, rod 438 is actuated to move in a clockwise direction in the plane of FIG. 4D, in such a manner that the force of gravity operating on weight 439 pulls it down into its operated position, which is indicated by the dotted lines in FIG. 4D. In accordance with the present invention, the weight 439 and the lever arm 438 are designed in such a manner that upon operation of the relief valve 406, rod 437 is prevented from moving backward and resetting. This brings about a particular feature of the invention, whereby the automatic restart system for the boiler is locked out upon operation of the relief valve 406, until the weight 439 is manually reset in its normal position, in a manner to be described presently in connection with operation of switch 442. Weight 439 is preferably enameled red for good visibility, and as a danger warning to apprise attendants that the relief valve has, in fact, operated.

In accordance with a further improvement, a third arm 443, of the same cross-sectioned dimensions as arms 437 and 438, and rotatable in the same plane, is also rigidly connected to pivot on rod 434. Arm 443 extends outwardly from pivot rod 434, making a fixed angle of 60 degrees with rod 438, and of 150 degrees with rod 437, looking counterclockwise in the plane of FIG. 4D. At its end, rod 443 is bent inwardly at an angle of 45 degrees to form a contacting member 444 which is 1⅝ inches long.

A switch 442, having a cylindrical body portion 448, is mounted to the lower portion of steel base plate 440, so that the principal axis of the cylinder 448 and the center line of the switch is located 2 inches below the top edge of guard 419. The switch 442, which is a single pole double throw switch shown in more detail in the enlarged sectional view of FIG. 4E, may be of any of the types well known in the art such as, for example, the microswitch manufactured by the MicroSwitch Company of Freeport, Illinois, a division of Honeywell, under the designation No. BZV6–2RQ62, as shown in their brochure 84–441AT–1–1.

The rectangular housing or body portion 448 of switch 442 is screwed or otherwise fastened onto the lower portion of plate 440, protruding outwardly 1¾ inches therefrom. The housing 448 is 2⅛ inches wide, and 3.04 inches long, terminating at one end in a cable connector 448a for accommodating input and output leads 451, 452 and 453, shown in dashed lines in FIG. 4E, which respectively lead to the contacts a, b and c of switch 442, inside of the housing 448. In normal operated condition of switch 442, contact a is in electrical conducting engagement with contact b. When the insulated button 447 is depressed, depressing spring 447a, contact between a and b of switch 442 is broken, and electrical contact is established between contacts b and c.

A rod actuator 445 is pivoted on an axle 446a mounted in a supporting member 446, fastened to the outer end of housing 448. Rod actuator 445 is urged to depress button 447 by the contact plate 444 at the end of rod 443, so that whenever the relief valve 406 operates so as to actuate operation target 439 to fall forward, arm 443 moves contact plate 444 against rod actuator 445, depressing button 447, thereby breaking engagement between contacts a and b, and establishing engagement between contacts b and c. The pretravel of the unattached end of 3-inch rod actuator 445 is about 0.35 inch, at which point it is designed to exert a pressure of between four and eight ounces on insulated button 447. However, switch arm 445 can travel ¾ of an inch further without injury to the mechanism.

The weight 439 and its lever arm 438, as well as lever arms 437 and 443, the latter terminating in contact plate 444, are all designed in proper relationship in accordance with the present invention so that upon operation of the valve 406, the rod 438 leans outwardly from the vertical at an angle sufficient to place the center of gravity of weight 439 to the right of the vertical center line of pivot 434, so that it falls by force of gravity into its operating position, in which position the contact plate 444 maintains contact with rod actuator 445. This causes button 447 to remain depressed against the tension of spring 447a, holding contacts a and b of switch 442 apart, until the weight 439 is manually reset to its normal unoperated position, thereby locking out the automatic restart system of the steam boiler 400, as will be described with reference to the circuit schematic of FIG. 4F.

In order to maintain the ledge 436 in proper position to actuate the operation target arm 437, resulting in operation of the microswitch 442; the yoke 418 must be maintained in a predetermined position in the plane of valve seat 408. This is achieved by welding, or otherwise securing the closed end of a U-shaped aligner 461 to the inside of guard 419, just below the top. (See FIGS. 4A, 4C.) The aligner 461 may comprise a ⅜ inch steel rod, the arms extended 3 inches inwardly in a horizontal plane and having about a 3 inch gap between them, to accommodate and guide the yoke 418 in its vertical motion, and to maintain the latter in a substantially uniform position in the horizontal plane so that the operation target and switch elements are aligned.

Let us refer, now, to FIG. 4F, which is a simplified circuit schematic for a fully automatic start-stop system of controls for a typical steam generator or heater, or the like. It will be seen that a power source 450 which may, for example, be a conventional 120 volt, 60 cycle alternating current source, is connected under normal conditions, when the explosion relief valve 406 is unoperated, through closed contacts a and b of switch 442, and through the normally closed contacts a and b of one or more additional switches 458, to ground 455 through the junction 457. To the latter is connected the circuit for one or more electrically operated fuel supply valves in an arrangement 459 for providing fuel to the boiler 400. The fuel supply valves may be operated, for example, by spring-loaded solenoids, or motor operated valves, which are held open normally, if the circuit is closed through every safety device, and if the combustion system is functioning properly.

Assuming, however, that the explosion relief valve 406 has operated, actuating the operation target 435, and causing switch 442 to break engagement with its contact a and engage its contact c, then the power to the fuel supply valves in circuit 459 is cut off, the solenoids or motor operated valves deactivated, and fuel supply valves closed, shutting down operation of the steam boiler 400 and locking out the automatic restart systems. Similar circuit arrangements may be employed to close down other elements of equipment.

Simultaneously, upon the engagement of contact c of switch 442, the source of power 450 is connected to a series of annunciator and alarm systems indicated by the box 454. These may include any of the annunciator or alarm devices well known in the art, which are employed to give visible or audible notice of an explosion to personnel, local or remote, in charge of or concerned with operation of the equipment. These may include, for example, signal lamps or switchboards in local or remote buildings, bells, sirens, etc.

Moreover, it will be seen that the disclosed circuit arrangement contemplates that switch 442 actuated by the explosion relief valve system 406 may be connected to the boiler shutdown circuit in series relation with one or more additional switches, such as 458, which are actuated upon the occurrence of other contingencies not necessarily related to the operation of the explosion relief valve 406 described herein. Moreover, upon operation of switch 458 breaking connection between its contacts *a* and *b*, and engaging its contact *c*, alarm devices similar to those described with reference to system 454 may be actuated. In any case, no fuel will be supplied to operate boiler 400 unless all of the safeguards represented by switches 442 and 458 are in order, and these switches are in position to complete the circuit from power source 450.

It will be understood that the circuits involved are substantially more complex than those shown by way of illustration, including circuit means of types well known in the art, to perform the specific necessary functions involved in each case.

Figure 5A:
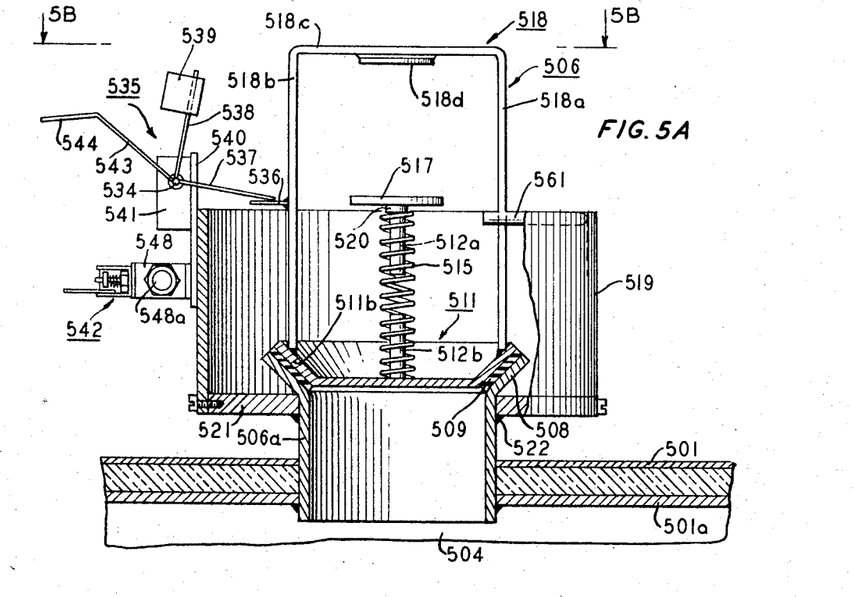
FIG. 5A is a front elevational view broken away to show the cross-section of the alternative embodiment of FIG. 3A, further modified to include an operation target.

Referring now to FIGS. 5A and 5B of the drawings, there is shown in sectioned front elevation and plan view, respectively, a combination in accordance with the present invention in which an operation target 535, substantially identical in form and operation to the structure 435 described with reference to FIGS. 4A, 4B, 4C, and 4D, is combined with a combustion relief valve system substantially of the type shown and described with reference to FIGS. 3A, 3B of the drawings. FIG. 5A shows a divided valve stem 512*a* and 512*b*, similar to the divided valve stems 312*a* and 312*b* of FIG. 3A. FIG. 5A also shows a valve seat having a flange 508, bent upwardly and outwardly at a 45 degree angle, which matches a flange 511*b* on the edge of valve head 511, the two flanged surfaces being separated by a similarly shaped gasket 509 of neoprene or the like, which elements are similar to like-numbered elements of FIG. 3A.

It will also be appreciated that by means of the specially designed platforms 517 and 518*d*, the combination shown in FIGS. 5A, 5B is designed to make use of the lift jack testing arrangement described in detail with reference to FIGS. 3A, 3B, utilizing the jack assemblage shown in FIG. 2C.

What is claimed is:

1. In combination with an automatic explosion relief valve disposed on a chamber for housing a potentially explosive environment, wherein said relief valve comprises a valve seat and a valve head constrained in normally closed condition to seat on said valve seat against the compression of a spring, and constructed in response to sufficient explosive force to be lifted off of said valve seat to provide an outlet for the products of an explosion occurring in said environment, the improvement which comprises in combination:

a guard comprising a cylindrical enclosure rigidly mounted in concentric relation to said valve seat below the level of said outlet and constructed to provide an upwardly extending channel completely surrounding said outlet for receiving the products of said explosion, said cylindrical enclosure being closed at the bottom with an annular closure sealed to the supporting wall of said valve seat below the periphery of said valve seat, and having an annular opening at the top, a member having at least a portion above said valve head, said member rigidly mounted in a position which is fixed relative to the vertical motion of said valve head, wherein said spring comprises a helically wound coil-spring having its lower end bearing on said valve head and its upper end bearing on a position fixed by said rigidly mounted member, said coil-spring encompassing at least in part a valve stem having one end connected to said valve head, wherein said coil-spring is movable vertically with reference to said valve stem.

means for testing the force required to unseat said valve head from said valve seat comprising a vertically extending frame supported by and rigidly fastened to said valve head at its lower end, said frame supporting at its upper end a connecting top bar disposed above said valve head with its principal surfaces in a plane substantially parallel to the principal plane of said valve head, a pair of supporting plates, one said plate disposed on the upper side of said rigidly mounted member centered on and in a plane substantially parallel to the principal plane of said valve head, the other said plate disposed on the lower side of said top bar centered on and in a plane substantially parallel to said one plate and spaced therefrom, and a test device comprising a vertically expanding lift jack having a pair of oppositely disposed platform members, a source of power connected to actuate said jack to increase the vertical separation between said platforms, each of said platforms constructed and arranged during a test to simultaneously engage a respective one of said supporting plates, and a gauge connected to said jack and calibrated to measure the force required to expand said lift jack to lift said valve head off of said valve seat.

2. The combination in accordance with claim 1 wherein said rigidity mounted member comprises a metal strut diametrically disposed across the upper open end of said cylindrical guard, and the upper face of the one said plate disposed on the upper side of said rigidly mounted member is located slightly above the upper end of said cylindrical guard to provide a tolerance above said upper end whereby said jack can be positioned for test purposes without disturbing said guard in its connection to said valve seat.

3. The combination in accordance with claim 2 wherein said valve stem comprises upper and lower rods vertically aligned but having their ends axially spaced apart, both of said rods mounted for slidable motion within said coil spring, the lower said rod fixed to the center of said valve head, and the upper said rod connected to said strut, the axial spacing between said ends in normally abutted condition of said relief valve being calibrated to just exceed the minimum expected vertical movement of said head in response to an explosion in said environment.

4. The combination in accordance with claim 3 wherein said valve seat and said valve head both terminate in mating peripheral flanges bent upwardly and outwardly from the horizontal plane at about 45 degree angle to provide rapid release for the products of an explosion in said chamber, and which includes a gasket comprising nonmetallic material, which does not adhere readily to metal, sandwiched between the adjacent surfaces of said flanges.

5. The combination in accordance with claim 4 wherein one portion of the annular end of said guard has connected thereto an automatic operation target disposed across the exit of said guard channel comprising in combination:

a support on the upper edge of said guard, lever means externally pivoted about a position on said support and disposed to assume at least two stable positions about said pivot position, said lever means constructed to assume a first stable position across a portion of the exit from said guard channel when no explosion has occurred in said environment and to assume a second stable position when an explosion has occurred in response to the force created by the products of explosion escaping from said guard channel, said lever means constructed and arranged in said second stable position to actuate signal means to apprise attendants of the operation of said relief valve.

6. The combination in accordance with claim 5 comprising:
- a switch,
- a source of electrical power,
- electrically actuated alarm means,
- relay means for cutting off operation of machinery in the chamber housing said explosive environment,
- said switch disposed for operation by said lever means in said second stable position to connect said source of electrical power to said alarm means and said relay means for actuating said alarm and cutting off operation of said machinery,
- wherein said lever means comprises at least two lever arms connected in rigid angular relationship for motion about said pivot position,
- a weight rigidly connected to one said lever arm and disposed to maintain said one lever arm in an inwardly directed position in said first stable position, and to shift the center of gravity of said weight maintaining said lever in an outwardly directed position in said second stable position,
- a contact member connected to said second lever arm, said contact member held apart from said switch in said first stable position and held in operating contact with said switch in said second stable position,
- and means including said switch and said relay means for actuating said alarm and cutting off operation of said machinery, said means including said switch being lock-operated by said contact until said one lever arm having said connected weight is manually reset in said first stable position.

7. In combination with an automatic explosion relief valve disposed on a chamber for housing a potentially explosive environmnet, wherein said relief valve comprises a valve seat and a valve head constrained in normally closed condition to seat on said valve seat against the compression of a spring, and constructed in response to sufficient explosive force to be lifted off of said valve seat to provide an outlet for the products of an explosion occurring in said environment, the improvement which comprises in combination:
- a guard comprising a cylindrical enclosure rigidly mounted in concentric relation to said valve seat below the level of said outlet and constructed to provide an upwardly extending channel completely surrounding said outlet for receiving the products of said explosion,
- said cylindrical enclosure being closed at the bottom with an annular closure sealed to the supporting wall of said valve seat below the periphery of said valve seat, and having an annular opening at the top,
- said guard having connected thereto an automatic operation target disposed across one portion of the annular opening of said guard channel,
- a support on the upper edge of said guard,
- lever means externally pivoted about a position on said support and disposed to assume at least two stable positions about said pivot position,
- said lever means constructed to assume a first stable position across a portion of the exit from said guard channel when no explosion has occurred in said environment and to assume a second stable position when an explosion has occurred in response to the force created by the products of explosion escaping from said guard channel,
- said lever means constructed and arranged in said second stable position to actuate signal means to apprise attendants of the operation of said relief valve.

8. The combination in accordance with claim 7 comprising:
- a switch,
- a source of electrical power,
- electrically actuated alarm means,
- relay means for cutting off operation of machinery in the chamber housing said explosive environment,
- said switch disposed for operation by said lever means in said second stable position to connect said source of electrical power to said alarm means and said relay means for actuating said alarm and cutting off operation of said machinery.

9. The combination in accordance with claim 7 comprising:
- a switch,
- a source of electrical power,
- electrically actuated alarm means,
- relay means for cutting off operation of machinery in the chamber housing said explosive environment,
- said switch disposed for operation by said lever means in said second stable position to connect said source of electrical power to said alarm means and said relay means for actuating said alarm and cutting off operation of said machinery,
- wherein said lever means comprises at least two lever arms connected in rigid angular relationship for motion about said pivot position,
- a weight rigidly connected to one said lever arm and disposed to maintain said one lever arm in an inwardly directed position in said first stable position, and to shift the center of gravity of said weight maintaining said lever in an outwardly directed position in said second stable position,
- a contact member connected to said second lever arm, said contact member held apart from said switch in said first stable position and held in operating contact with said switch in said second stable position,
- and means including said switch and said relay means for actuating said alarm and cutting off operation of said machinery, said means including said switch being lock-operated by said contact member until said one lever arm having said connected weight is manually reset in said first stable position.

References Cited
UNITED STATES PATENTS

| | | | |
|---|---|---|---|
| 1,861,420 | 5/1932 | Mahan | 137—543.15 XR |
| 2,356,410 | 8/1944 | Krugler | 137—469 |
| 2,661,016 | 12/1953 | Leffler | 137—469 |
| 2,787,127 | 4/1957 | Benz | 137—469 XR |
| 3,100,502 | 8/1963 | Ford et al. | 137—554 XR |
| 3,154,248 | 10/1964 | Fulton et al. | 122—504 XR |

HENRY T. KLINKSIEK, Primary Examiner

U.S. Cl. X.R.

122–504; 137–523, 543.15, 543.17, 554.

PO-1050
(5/69)

UNITED STATES PATENT OFFICE
CERTIFICATE OF CORRECTION

Patent No. 3,462,994　　　　　　　　Dated August 26, 1969

Inventor(s) Charles I. Maust

It is certified that error appears in the above-identified patent and that said Letters Patent are hereby corrected as shown below:

Column 9, line 54, "312" should read --412--.

Column 15, line 62, after the comma insert --comprising--;

line 63 to the end of Claim 7, please indent each of the recitations to indicate that they are all parts of the automatic operation target recited in lines 60-62.

Signed and sealed this 13th day of July 1971.

(SEAL)
Attest:

EDWARD M. FLETCHER, JR.　　　　　　　WILLIAM E. SCHUYLER, JR.
Attesting Officer　　　　　　　　　　Commissioner of Patents